(12) United States Patent
Eerola et al.

(10) Patent No.: US 7,505,511 B2
(45) Date of Patent: *Mar. 17, 2009

(54) MATCHED FILTER AND SPREAD SPECTRUM RECEIVER

(75) Inventors: Ville Eerola, Julkujärvi (FI); Tapani Ritoniemi, Peräseinäjoki (FI)

(73) Assignee: Atheros Technology Ltd., Santa Clara, CA (US)

( * ) Notice: Subject to any disclaimer, the term of this patent is extended or adjusted under 35 U.S.C. 154(b) by 447 days.

This patent is subject to a terminal disclaimer.

(21) Appl. No.: 11/317,289

(22) Filed: Dec. 23, 2005

(65) Prior Publication Data

US 2006/0209936 A1    Sep. 21, 2006

Related U.S. Application Data

(63) Continuation of application No. 09/689,854, filed on Oct. 13, 2000, now Pat. No. 7,010,024.

(30) Foreign Application Priority Data

Oct. 13, 1999  (FI) .................................. 19992211
Sep. 29, 2000  (FI) .................................. 20002155

(51) Int. Cl.
     *H04L 27/30*       (2006.01)
(52) U.S. Cl. ..................... 375/152; 375/150; 375/343
(58) Field of Classification Search ................. 375/142, 375/143, 150, 152, 343; 370/320, 342, 441, 370/479
See application file for complete search history.

(56) References Cited

U.S. PATENT DOCUMENTS

| 5,377,225 A | 12/1994 | Davis |
| 5,640,416 A | 6/1997 | Chalmers |
| 5,715,276 A | 2/1998 | Tran et al. |
| 5,761,239 A | 6/1998 | Gold et al. |
| 5,903,595 A | 5/1999 | Suzuki |

(Continued)

FOREIGN PATENT DOCUMENTS

EP     0 772 305 A2    5/1997

(Continued)

OTHER PUBLICATIONS

Berg Gyselinckx et al., "A 4-2.5Mchip/s Direct Sequence Spread Spectrum Receiver with Digital IT and Integrated Arm6 Core.", In:IEEE 1997 Custom Inttgrated Circuites Conference, pp. 461-464, May 5-8, 1997.

*Primary Examiner*—Dac V Ha
(74) *Attorney, Agent, or Firm*—Gates & Cooper LLP

(57) ABSTRACT

A matched filter for implementing the correlation of an input signal and a reference signal. The matched filter comprises N parallel M-sample long shift registers for receiving an equal number of input signals at the sampling frequency of the input signal, wherein N≧2, and then multiplexes one of the input signals and one of the reference signals at a time to calculation logic by applying alternately at least one combination of the input signals and the reference signals to the calculation logic. The calculation logic may then calculate the correlation time-dividedly for each combination of an input signal and a reference signal so that correlation results calculated from different signals appear at the output of the calculation means as a sequence.

13 Claims, 12 Drawing Sheets

U.S. PATENT DOCUMENTS

| | | | |
|---|---|---|---|
| 5,920,589 A | 7/1999 | Rouquette et al. | |
| 5,933,447 A | 8/1999 | Tran et al. | |
| 5,999,561 A | 12/1999 | Naden et al. | |
| 6,130,906 A * | 10/2000 | Davidovici et al. | 375/152 |
| 6,181,733 B1 * | 1/2001 | Shinde | 375/152 |
| 6,363,108 B1 * | 3/2002 | Agrawal et al. | 375/152 |
| 6,366,938 B1 * | 4/2002 | Levison et al. | 708/422 |
| 6,526,322 B1 | 2/2003 | Peng et al. | |

FOREIGN PATENT DOCUMENTS

| | | |
|---|---|---|
| EP | 0 855 796 A2 | 7/1998 |
| EP | 0 874 471 A2 | 10/1998 |
| EP | 0 886 386 A2 | 12/1998 |
| EP | 0 924 532 A2 | 6/1999 |
| EP | 0 924 871 A2 | 6/1999 |
| EP | 0 944 178 A2 | 9/1999 |
| EP | 0 772 305 A3 | 12/2001 |
| EP | 0 855 796 A3 | 7/2002 |
| EP | 0 886 386 A3 | 10/2002 |
| GB | 2 315 647 | 2/1995 |

* cited by examiner

MATCHED FILTER AND SPREAD SPECTRUM RECEIVER

CROSS-REFERENCE TO RELATED APPLICATION

This application is a continuation and claims the priority benefit of U.S. patent application Ser. No. 09/689,854, filed Oct. 13, 2000, which issued Mar. 7, 2006 as U.S. Pat. No. 7,010,024, entitled "Matched Filter and Spread Spectrum Receiver", the disclosure of which are hereby incorporated by reference.

BACKGROUND OF THE INVENTION

The invention relates to a matched filter, a spread spectrum receiver and particularly to the correlation of a reference signal and a signal incoming to the receiver. A spread spectrum system is a telecommunications system in which the bandwidth used for transmitting a signal is substantially wider than is required for the data to be transmitted. The spectrum of the signal is spread in a transmitter by means of a pseudo-random spreading code, which is independent of the original data. In direct sequence spread spectrum systems (DS-SS), a spectrum is spread to the available bandwidth by shifting the phase of the carrier in accordance with a pseudo-random spreading code. The bits of a spreading code are usually called chips as distinct from actual data bits.

FIG. 1 shows a block diagram illustrating a direct sequence-based spread spectrum system. In the system, a signal of a data source 1-2 is first modulated in a data modulator 1-4 of a transmitter 1-1, whereupon a complex 1-6, 1-8 signal outcoming from the modulator 1-4 is modulated by multiplying said data modulated signal by a complex 1-12, 1-13 spreading code generated by a code generator 1-10 in a multiplier 1-14. A spreading code modulator 1-16 spreads the spectrum to be transmitted by means of the spreading code. A carrier generated by a high-frequency oscillator 1-20 is then modulated in a multiplier 1-18 by said data and code modulated signal, and an imaginary part 1-22 is removed from the signal to be transmitted. The transmitted signal propagates from an antenna 1-24 in the transmitter over a transmission path 1-26 to an antenna 1-32 in a receiver 1-30. In the receiver 1-30, a front end filter 1-34 separates an information signal from the entire frequency spectrum. A complex 1-35, 1-36 signal is mixed to a lower frequency by multiplying the signal by a complex 1-42, 1-44 signal generated by a voltage-controlled oscillator 1-40 in a multiplier 1-45.

In the receiver of a spread spectrum system, a reference signal, a code replica, which is an identical copy of said spreading code, is used in a despread modulator (spreading code demodulator) 1-48 to narrow the spectrum of an incoming signal. In FIG. 1, a code generator 1-46 generates said spreading code replica, which is correlated in a multiplier 1-50 with a received signal by said spreading code replica. If the code replica and the received code are the same and in phase, they correlate, and the transmitted data modulation can be restored to what it was before spreading. At the same time, different spurious signals are also spread. A band-pass filter 1-52, succeeding the despread modulator 1-48, lets the data modulation through, but removes most of the power of a spurious signal, which improves the signal-to-noise ratio of the received signal.

In order to enable the detection of transmitted data in a spread spectrum receiver, the code replica generated by the receiver has to be synchronized (acquisition) with the received code as accurately as possible, and said synchronization has to be maintained (signal tracking). The spreading code replica generated in the receiver thus has to be and stay in phase with the spreading code included in the received signal. For this reason, a special synchronization algorithm or unit is required for code synchronization, in addition to regular carrier and data synchronization. The speed of the acquisition, i.e. the time taken by the code replica to hit the right phase with the received code, is an important performance parameter of a spread spectrum system. Many methods have been developed for the acquisition, in addition to which the system may comprise different aids for the acquisition that are related to the transmitted signal.

Matched filters are devices whose output is a time-reversed replica, a copy of the desired incoming signal, when the input is an impulse. Thus the transfer function of a matched signal is a complex conjugate of the signal matched thereto. A matched filter can be implemented to operate either continuously or discretely. A matched filter calculates the correlation between a known reference signal and the signal to be measured, and gives a maximum output when the reference signal best corresponds to the incoming signal. For this reason, a matched filter is usable in signal acquisition in spread spectrum systems for searching for the right phase of the reference signal generated by a receiver. A matched filter may be shown to be the optimal way to identify signals from AWGN (Additive White. Gaussian Noise) type of noise.

FIG. 2 shows a signal flow diagram of a feasible implementation of a matched filter. It consists of a delay line having intermediate outputs and of a passive filter matched to the waveform of a PRN (Pseudo Random Noise) chip. The output of the filter is matched to the basic pulse form of PRN spreading bits. In FIG. 2, in(n) represents a signal incoming to a filter and in(n−1), in(n−2) . . . in(n−$N_{MF}$+1) represent an incoming signal delayed by 1,2 to $N_{MF}$+1 delay elements Tc. c(0), c(1) . . . c($N_{MF}$−1) represent coefficients by which the incoming signal, delayed in different magnitudes, is multiplied. After the multiplication, the signals are summed up in an adder 2-10 and the sum signal is filtered in a filter 2-20. The use of a matched filter in the synchronization of spread spectrum systems is known for example from '*Spread Spectrum Communications Handbook*', Marvin K. Simon et al., McGraw-Hill, 1994, pages 815 to 832. In a known matched filter, the filter is matched to one received signal at a time. This requires either the use of several matched filters or the search for one signal at a time, should the intention be to search for more than one signal.

When a band-pass type of signal is searched for with a matched filter from a received noisy signal, in known solutions the signal coming to the matched filter is pre-processed by multiplying it by a carrier estimate, which removes the frequency offset of the receiver. If the frequency offset is not known, the signal has to be searched for at different frequency offsets over the entire frequency inaccuracy range. Furthermore, a matched filter searches for the right phase of the reference signal generated by a receiver. A matched filter calculates the correlation between a known signal and the signal to be measured, i.e. generates a measure for the identity of the two signals. The outputs generated by the filter are typically non-coherently detected amplitude values.

Said measure is then compared with a set threshold value in order to decide if the two signals are in sync. In the simplest case, exceeding the threshold value means that the signal corresponding to the reference signal has been identified and that the spreading code of the identified signal is in phase with the reference signal. This information serves to initiate actual signal tracking and reception. If no identification occurs (the threshold value is not exceeded), the acquisition system changes the phase of the locally generated reference code or changes reference signals, whereupon the correlation is repeated. This continues until identification and synchronization are achieved, i.e. the reference signal corresponds best to the incoming signal. In this case the filter yields a maximum output. The tracking algorithm of the received signal is then initiated.

Since in the acquisition system, a band-pass type of signal is searched, the matched filter has to be implemented either as a band-pass or an equivalent low-pass filter version. A low-pass type of acquisition system using a matched filter is shown in FIG. 3. Therein, a signal 3-1 incoming to identical, matched filters 3-10, 3-12 is divided into two parts, I and Q branches (I stands for In-phase, Q for Quadrature), and a signal that is generated by a local oscillator 3-2 and whose frequency can be substantially equal to the sum of the intermediate frequency of the receiver and the Doppler frequency of the received signal is used to multiply a signal of the 3-1 branch in a multiplier 3-6. Before a signal of the 3-Q branch is multiplied in a multiplier 3-8, the phase of a signal generated by the local oscillator is shifted 90 degrees in a phase inverter 3-4.

After the multiplication of the incoming signal, signals incoming from 3-I and 3-Q branches are correlated in substantially identical matched filters 3-10 and 3-12 with a code replica generated in the receiver. The signals outcoming from the matched signals are then detected, i.e. the signals of both branches are squared in elements 3-14 and 3-16, and the squared signals are summed up in an adder 3-18 to obtain the square of the absolute value of a complex ingoing signal. A threshold value detector 3-20 then compares the value of the detected signal with a preset threshold value, a reference value. In the simplest case, exceeding the threshold value means that a signal corresponding to said reference signal has been detected and its spreading code is in phase with the stored reference signal. The information is used to initiate actual signal tracking and reception.

In the structures of generally known matched filters, the timing of a reference signal and an incoming signal is fixed at the planning stage, and cannot thus be adjusted accurately for different timings. This causes problems for tracking signals having a low signal-to-noise ratio, since the integration time required by them is long. This, in turn, requires accurate timing in the sampling of a matched filter, since the operation of a matched filter is subject to its reference signal being of the same length as a received signal in the time domain. In systems, in which the movement of a transmitter and receiver with respect to one another is fast, a Doppler shift, whose magnitude depends on the frequency of said signal component, is created in the carrier and the spreading code. Since the frequency of the spreading code depends on the Doppler shift, the frequency is not always exactly the same. This should also be accounted for in the acquisition system if the required integration time ($T_1$) is long. If the inaccuracy of the frequency exceeds $1/T_1$, the timing of the code changes more than one chip during integration, which prevents the acquisition system from operating.

The integration time of a DS-SS acquisition system is also limited by the modulation of the transmitted data. Generally, the integration cannot be continued over a transmitted data symbol unless the modulation can be compensated for before the integration. For example in the widely used BPSK modulation (Binary Phase Shift Keying), a change in a data bit causes a 180° phase change in the signal, corresponding to an inversion in its sign. This is why the integration over a data bit causes significant degradation to the signal. Consequently, when the integration time is longer than the length of a data symbol, coherent integration can no longer be used. The use of non-coherent integration only is not feasible, since non-coherent detection weakens the signal-to-noise ratio if the incoming signal-to-noise symbol is initially negative.

A pass-band or low-pass type of matched filter can be implemented either as analog or digital. The most usual way is to implement matched filters based on the analog technology, wherein the delay line is implemented by SAW (Surface Acoustic Wave) or CCD (Charge Coupled Device) technologies. However, at the manufacturing stage, said systems are built for only a given reference signal. The delay line of an analog discrete-timed matched filter can be implemented for example based on the SC technology (Switched Capacitor). However, a problem in this technology is aliasing, for example.

The advancement of the digital technology has also brought about digitally implemented matched filters. To implement the required rapid summing up of many values is difficult in a digital filter. In a matched filter, stored signal samples, multiplied by the reference signal along the length of the filter have to be calculated to generate one outcoming sample. Conventionally, this has been accomplished by summing up a small number of numbers at a time and by repeating the process during several clock cycles. This avoids the implementation of a multiple-input adder.

BRIEF DESCRIPTION OF THE INVENTION

The object of the invention is a novel matched filter.

This object is achieved with a matched filter for implementing the correlation of an input signal and a reference signal, the filter comprising:

N parallel M-sample long shift registers for receiving an equal number of input signals at the sampling frequency of the input signal, wherein $N \geq 2$;

first means for storing K M-sample long reference signals, wherein $K \geq 1$;

multiplexing means for applying one input signal and one reference signal at a time from said shift registers and said storage means to correlation calculation means by applying alternately at least one combination of the input signals and the reference signals; and calculation means for calculating the correlation time-dividedly for each combination of an input and reference signal so that correlation results calculated from different signals appear at the output of the calculation means as a sequence.

Another aspect of the invention is a filter for implementing the correlation of an input signal and a reference signal, the filter comprising:

an M-sample long shift register for receiving an input signal at the sample frequency of the input signal;

. . . first means for storing K M-sample long reference signals, wherein $K \geq 2$;

multiplexing means for applying one input signal and one reference signal at a time from said shift registers and said storage means to correlation calculation means by applying alternately at least one combination of the input signal and the reference signals; and calculation means for calculating the correlation time-dividedly for each combination of an input and reference signal so that correlation results calculated from different signals appear at the output of the calculation means as a sequence.

Still another aspect of the invention is a spread spectrum receiver comprising a device for detecting a demodulated signal, received by the receiver and converted into digital samples, the device comprising a matched filter for calculating the correlation between the input signal and at least one reference signal, and a controller for comparing the correlation results generated by the matched filter with a predetermined threshold value to determine if a signal is found, said matched filter comprising:

N parallel M-sample long shift registers for receiving an equal number of input signals at the sampling frequency of the input signal, wherein $N \geq 2$;

first means for storing K M-sample long reference signals, wherein $K \geq 1$;

multiplexing means for applying one input signal and one reference signal at a time from said shift registers and said storage means to correlation calculation means by applying alternately at least one combination of the input signals and the reference signals; and calculation means for calculating the correlation time-dividedly for each combination of an input and reference signal so that correlation results calculated from different signals appear at the output of the calculation means as a sequence.

Yet another aspect of the invention is a spread spectrum receiver comprising a device for detecting a demodulated signal, received by the receiver and converted into digital samples, the device comprising a matched filter for calculating the correlation between an input signal and at least one reference signal, and a controller for comparing the correlation results generated by the matched filter with a predetermined threshold value to determine if a signal is found, said matched filter comprising:

an M-sample long shift register for receiving an input signal at the sample frequency of the input signal;

first means for storing K M-sample long reference signals, wherein $K \geq 2$;

multiplexing means for applying one input signal and one reference signal at a time from said shift registers and said storage means to correlation calculation means by applying alternately at least one combination of the input signal and the reference signals; and calculation means for calculating the correlation time-dividedly for each combination of an input and reference signal so that correlation results calculated from different combinations appear at the output of the calculation means as a sequence.

The invention is based on time-multiplexing in a matched filter at least two input signals to correlate with at least one spreading code or, alternatively, time-multiplexing at least two spreading codes to correlate with at least one input signal, allowing the same calculation capacity to be used for several signals. Conventional matched filters are matched to one signal at a time, and therefore more than one filter has had to be used to simultaneously search for more than one signal to be received.

In a primary embodiment of the invention, an arithmetic unit comprises M multipliers, which multiply each sample in the shift register by a sample of a corresponding reference signal, and yield M results, and an adder means for summing up said M results to generate a correlation result at the output of the filter, wherein M is the length of the filter. Such an arithmetic unit has to be able to very rapidly process a large number of numbers, wherefore it is difficult to implement. It is advantageous for the implementation if several matched filters are able to share this arithmetic unit.

The invention is suitable for digital implementations. The invention is particularly suitable for use in spread spectrum systems, which simultaneously use several spreading codes.

BRIEF DESCRIPTION OF THE FIGURES

The invention will now be described in greater detail by means of preferred embodiments with reference to the attached drawings, in which.

DETAILED DESCRIPTION OF THE INVENTION

In the present document, a complex signal refers to a signal composed of two signal components, a real part and an imaginary part. Alternatively, the terms used are the I and Q branches or components of a signal (In-phase and Quadrature). Amplitude and phase can be determined for a complex signal. Amplitude is obtained by using a mathematically defined absolute value operator for complex numbers. Phase can be calculated as a mathematically defined argument of a complex number.

An acquisition system according to a primary embodiment of the invention implements K parallel channels time-divisionally. The limitation in the number of channels originates from the relation of the main clock frequency to the sampling frequency required by the matched filter. In the primary embodiment of the invention, this relation is 2·K. A matched filter processes the In-phase (I) and Quadrature (Q) components of each channel, which decreases the number of potential channels to the number K. If the number of potential channels is less than the total number ($K_{TOT}$) of spreading codes to be searched for, the spreading codes to be searched for are changed periodically in the primary embodiment of the invention. The reference signals corresponding to the spreading codes to be verified are located in a read-only memory (ROM), and the reference signals are time-multiplexed by incrementing the address counter of said ROM. The counter counts from a basic address up to number K on the modulo-$K_{TOT}$ principle, i.e. address 0 follows address $K_{TOT}-1$. The reference signals used are changed by changing this basic address, and this is done when all possible frequencies have been gone through in a manner configured by the user.

The basic address is changed as a configurable address addition, which is also calculable on the modulo-$K_{TOT}$ principle. This adjustable basic addition allows the search process according to the search situation to be optimized.

Figure 1:
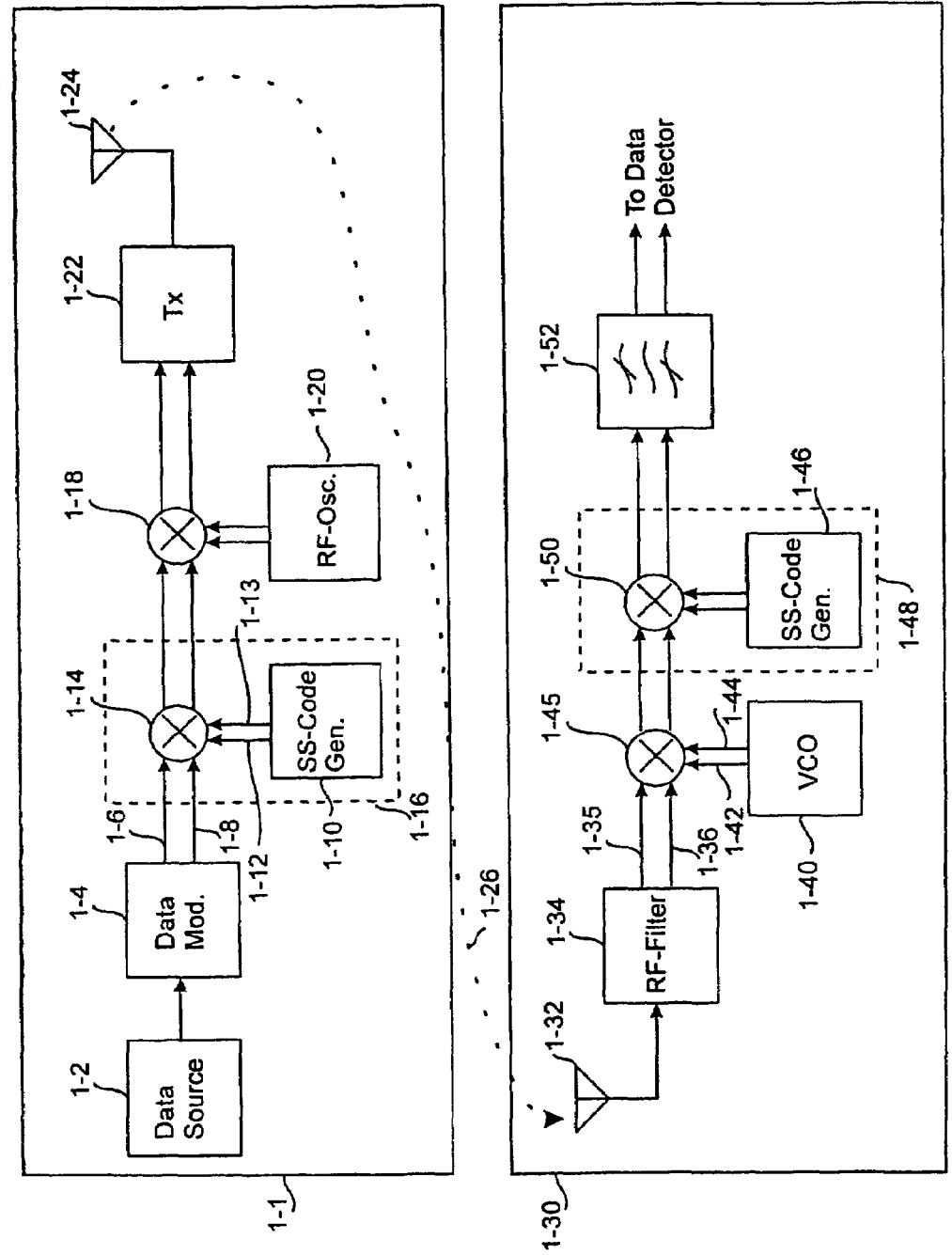
FIG. 1 illustrates a direct sequence-based spread spectrum system.
Figure 2:
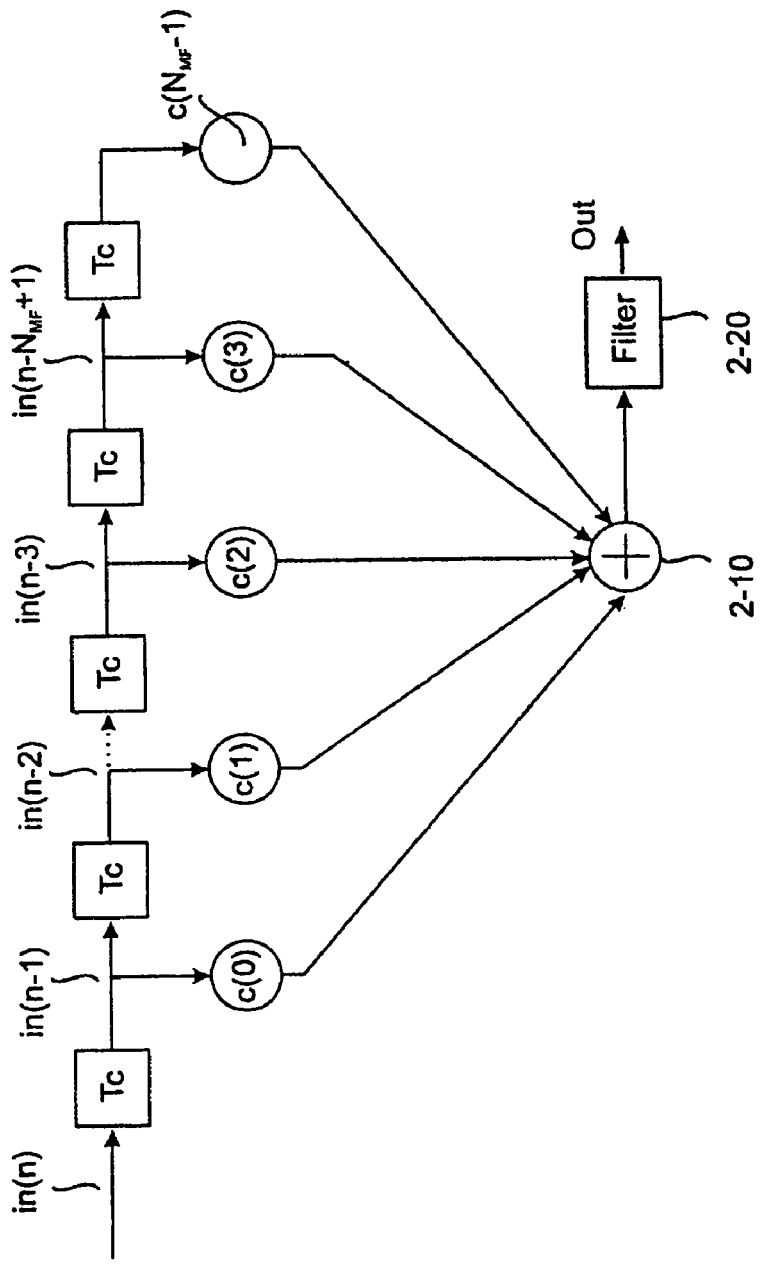
FIG. 2 shows a prior art implementation of a matched filter.
Figure 3:
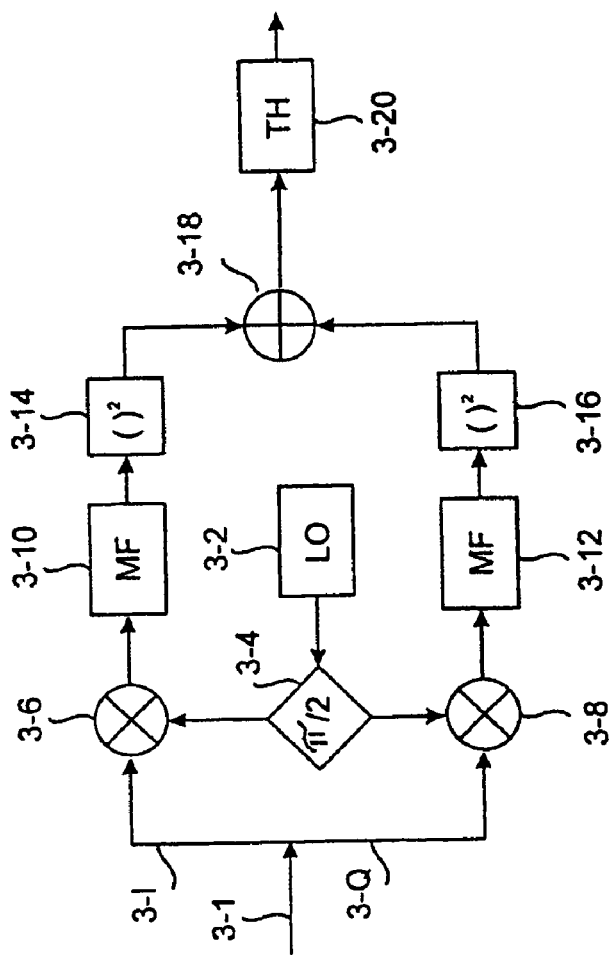
FIG. 3 shows a low-pass type of acquisition system using a matched filter.
Figure 4:
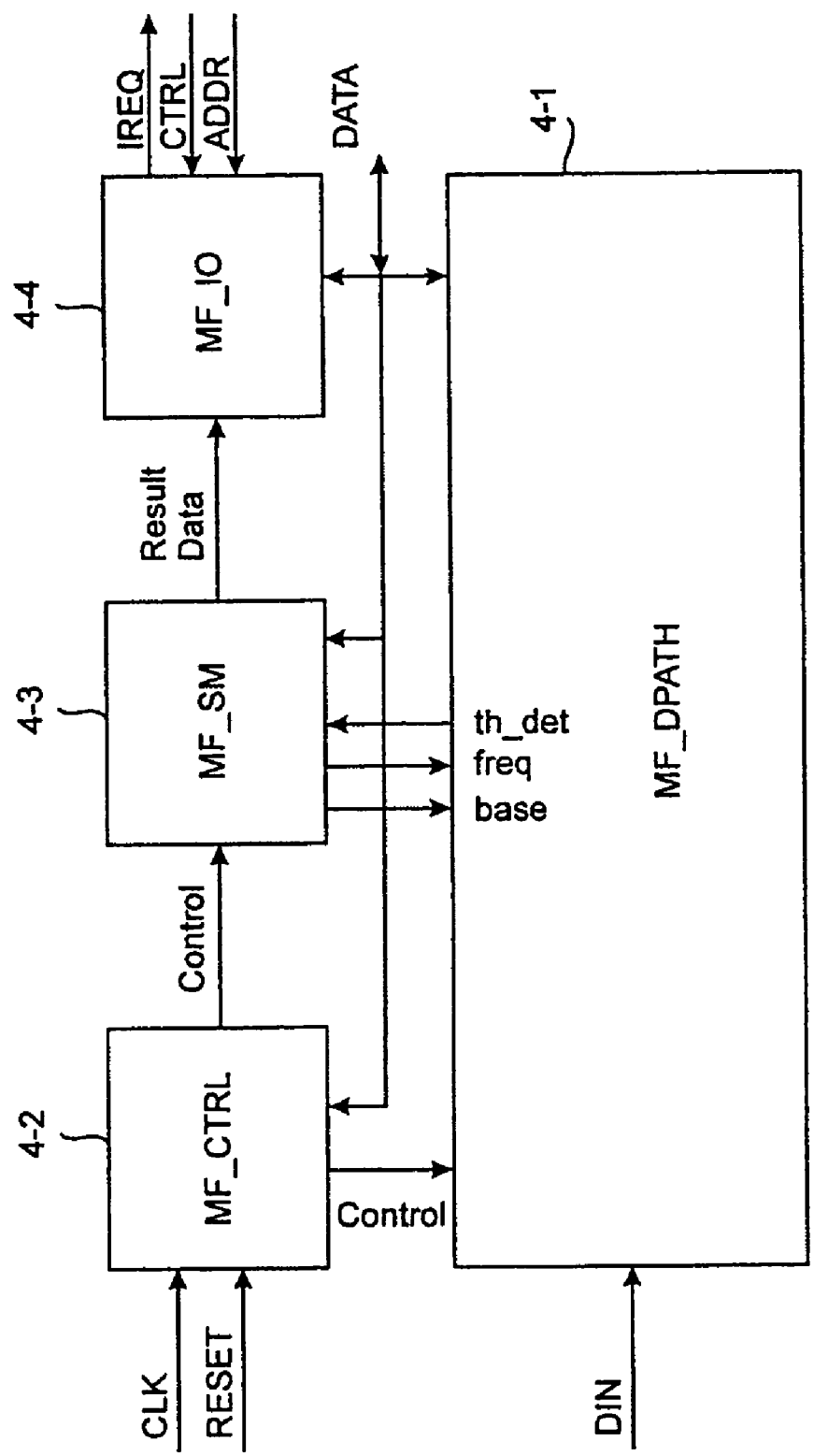
FIG. 4 illustrates the general architecture of an acquisition system of the spread spectrum receiver according to a primary embodiment of the invention.

FIG. 4 shows the general architecture of the acquisition system according to a primary embodiment of the invention. The acquisition system comprises four basic blocks: a data path block 4-1, containing the actual matched filter implementation; a control block 4-2 for generating the necessary control signals for the other blocks; a state machine 4-3 for controlling the search algorithm; and an I/O block 4-4 for connecting the matched filter to an outer bus of the acquisition system. In the following, some of the blocks will be described in greater detail.

Data Path Block

Figure 5:
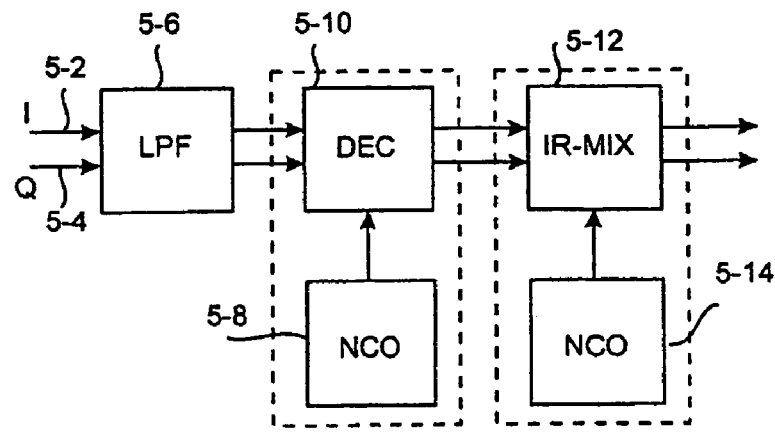
FIG. 5 is a block diagram illustrating data path pre-processing blocks according to the primary embodiment of the invention.

The data path block is the core of the acquisition system. A matched filter is of the low-pass type, and the data path arithmetic is time-multiplexed to process both I and Q channels. In this implementation, the length of the matched filter is $M=N_{MF}$ samples. The data path block of a matched filter comprises, not only the data path of the matched filter, but also blocks for processing an input signal. FIG. 5 illustrates an implementation of the pre-processing stages of a data path block. In FIG. 5, a sampled, complex signal 5-2 and 5-4 (I and Q components), received from an RF front end and converted into digital is filtered in a low-pass filter 5-6 to prevent aliasing. The signal is then sampled at a frequency controlled by a numerically controlled clock oscillator (NCO) 5-8 in a decimation element 5-10, which generates processed samples at the sampling frequency of the matched filter. The sampling frequency of the input of the matched filter is adjusted by means of the clock oscillator 5-8 so that the timing of the input signal corresponds to the timing of the samples of the reference signal.

After sampling, the samples are multiplied in a multiplier 5-12 by a complex carrier frequency replica generated by another numerically controlled oscillator 5-14. The carrier frequency replica is of the form:

$$e^{i2\pi\omega_c n/F_s} = \cos(2\pi\omega_c n/F_s) + j \cdot \sin(2\pi\omega_c n/F_s)$$

wherein $\omega_c$, n and $F_s$ represent carrier frequency, sample number and sample frequency, respectively.

Thus the multiplication corresponds to rotating the phase of the input signal by the (estimated) carrier frequency. This multiplication may be also be implemented before re-sampling, should the frequency of the input signal exceed the sampling frequency of the matched filter.

Figure 6:
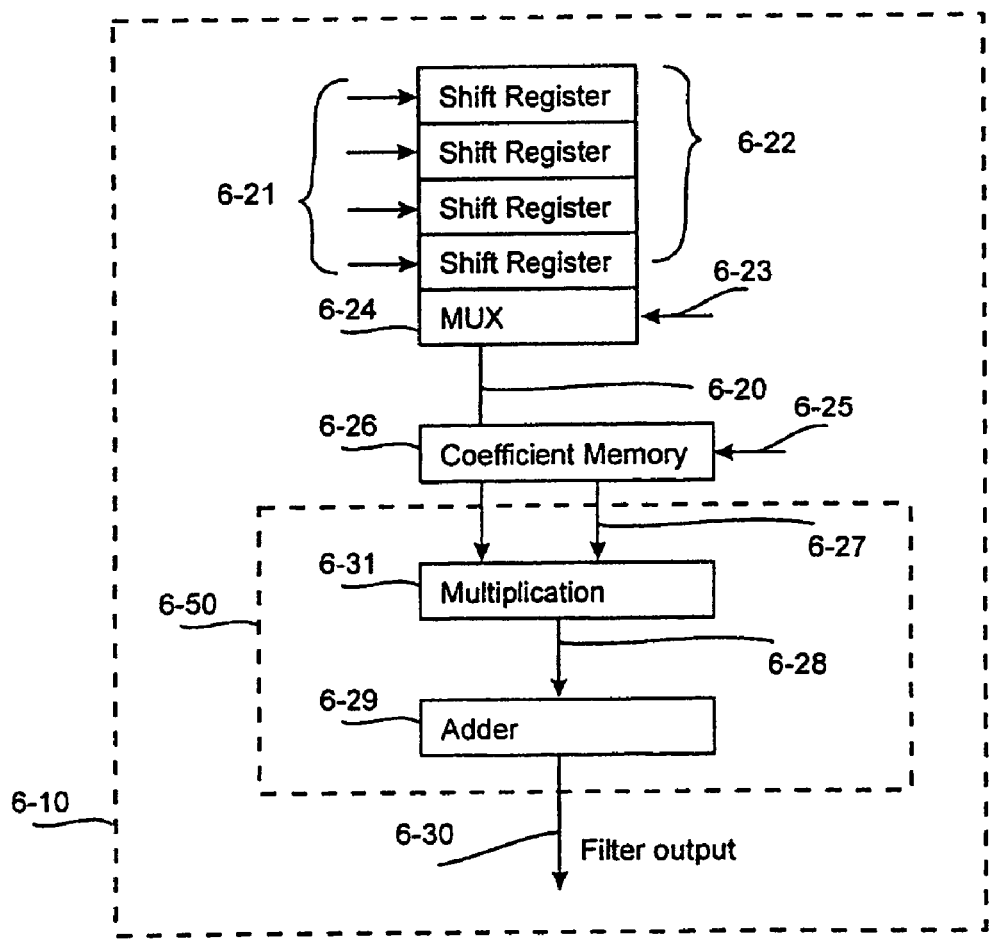
FIG. 6 is a block diagram illustrating a matched filter of a data path according to the primary embodiment of the invention.

FIG. 6 shows the core block of a data path block, constituting an actual matched filter 6-10. The samples generated from the input signal (for example in the pre-processing stages of FIG. 5) are applied to said matched filter, which calculates their correlation with one or more reference signals. The filter comprises a number of parallel shift registers 6-22, one for each I and Q component of the signal. In the primary embodiment of the invention comprising K separate channels, i.e. 2·K I and Q components, 2·K shift registers 6-22 are needed. Each incoming I or Q data stream 6-21 is applied to the corresponding shift register 6-22, which is clocked at the code frequency or its multiple. The data stream applied to the shift register 6-22 is compared with reference signals stored in a memory 6-26, e.g. ROM or RAM (Random Access Memory). Signals to be compared time-dividedly are selected from the shift register 6-22 and the memory 6-26, allowing the use of the same arithmetic part used for K channels, in accordance with the basic principles of the invention.

The input signal is selected with a signal multiplexer 6-24 and a selection signal 6-23, whereas the reference signal is selected from the memory 6-26 with a selection signal 6-25. In practice, the selection signal 6-25 can be a memory address. The memory addresses may have been created in an address generation unit, which applies read addresses synchronously to the read memory 6-26 in a manner to be described in connection with the state machine. This solution allows several spreading codes to be searched for in parallel by time-multiplexing the reference signals used. Consequently, the address 6-25 can be used to assign in the memory 6-26 the desired reference signal 6-27 for an input signal 6-20 selected with the selection signal 6-23. Alternatively, the memory 6-26 can be replaced with a reference shift register to which a reference signal generator applies the reference signal. The reference shift register may be similar to the shift register 6-22.

The reference signal applied at each particular time from the reference shift register (or reference memory) 6-26 and from the data shift register 6-22, and the I and Q signals are multiplied by each other in a multiplier block 6-31. If both signals are composed of 1-bit samples, the multiplication may be carried out for example with an XNOR gate whose output is 1 if its two inputs are equal. In another embodiment the multiplication may be carried out with an XOR circuit. After this multiplication, there are $N_{MF}$ data values 6-28.

Next, block 6-29 sums up all products of the multiplications for each sample to generate the final outputs of the matched filter. In the primary embodiment of the invention, this is implemented with an adder block, which calculates the sum of all products during one clock cycle. In this connection, other summing methods may also be used.

An output 6-30 in the matched filter is composed of complex signals that correspond to the correlation of the input as a function of time. If the signal to be correlated is periodic and the length of period is $N_c$, samples, periods of $N_c$ samples may be separated for each signal at the output 6-30, the periods corresponding to cross correlations having different phase differences. In the case of a multi-channel (K channels) matched filter, outputs corresponding to the same phase difference of several channels (K) are in succession at the output 6-30.

Such a structure allows the outputs of K parallel matched filters to be calculated in succession, when the clock frequency used is 2·K times the sampling frequency of the incoming data.

Consequently, in a matched filter, stored signal samples of the length of the matched filter, multiplied by a reference signal, have to be calculated for one output. Conventionally, this is accomplished by summing up a small number of numbers at a time and by repeating the process during several clock cycles. This avoids the implementation of adders having a plurality of inputs. Known digitally implemented delay lines have also comprised only one reference signal, allowing only one signal to be correlated simultaneously with the same device. As described above, the present invention and its preferred embodiments allow easy, rapid and effective summing up of several values.

Figure 7:
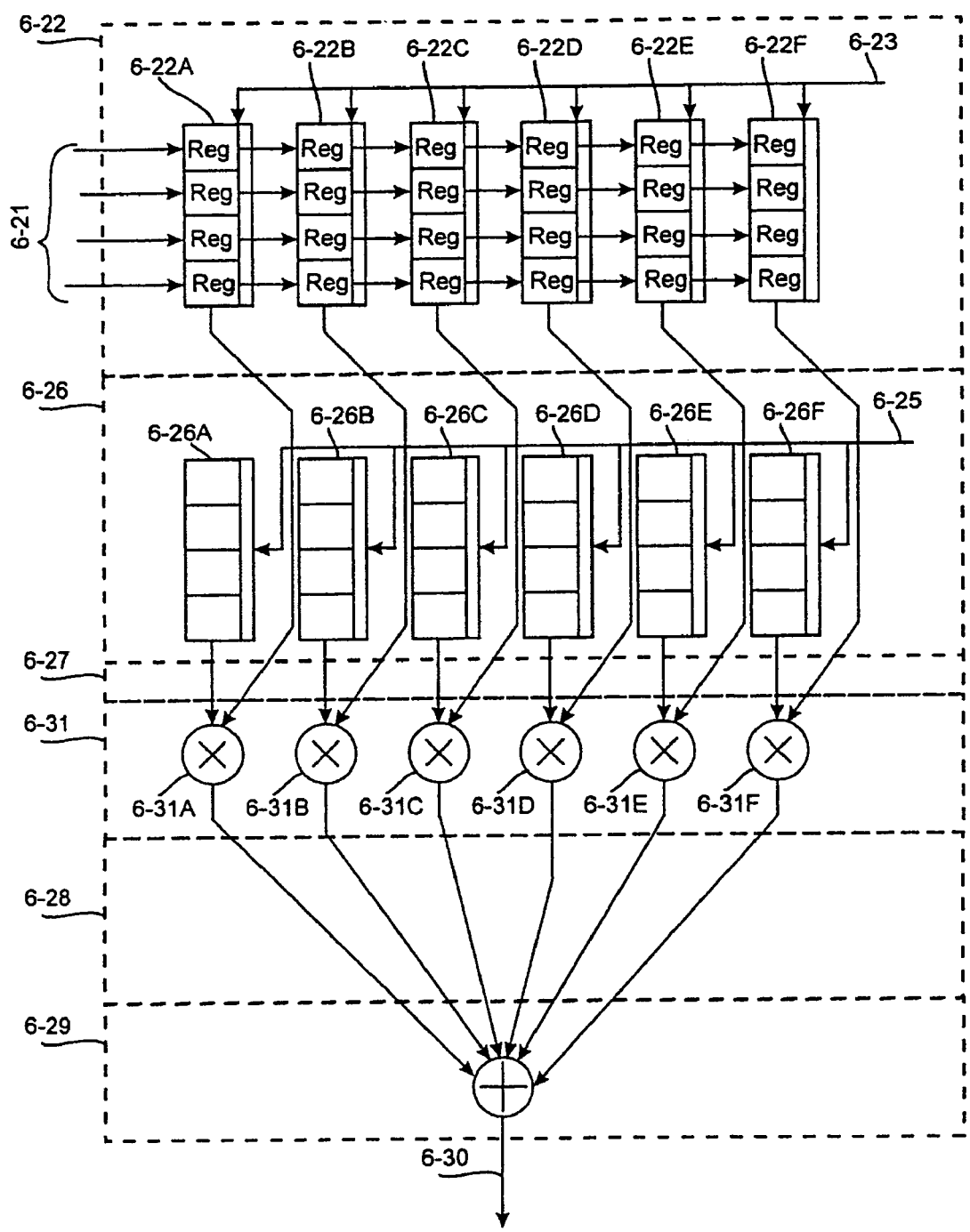
FIG. 7 shows a more detailed embodiment of the filter of FIG. 6.

FIG. 7 shows a more detailed block diagram of an implementation of the matched filter of FIG. 6. For the sake of clarity, the embodiment is shown using four 6-sample long shift registers, four 6-sample reference signals and four multipliers. However, the filter can easily be extended to be suitable for any number of signals and register length.

FIG. 7 shows four 6-sample shift registers 6-22 for receiving four input signals 6-21, each of the registers comprising stages 6-22A . . . 6-22F (i.e. one stage per sample). The upper row in stages 6-22A . . . 6-22F constitutes the first shift register, the second row the second shift register, etc. The selection signal 6-23 selects the row among the shift register stages 6-22A . . . 6-22F that is applied as an output to the multiplier block 6-31 at each particular time. Code replicas (reference signals) are stored in a coefficient memory 6-26 composed of six four-location memory elements 6-26A . . . 6-26F. The first row in the memory elements stores a first code replica, the second row a second code replica, etc. The selection signal 6-25 selects the row among the memory elements 6-26A . . . 6-26F that is applied as an output to the multiplier block 6-31 at each particular time. The multiplier element 6-31 comprises 6 parallel multipliers 6-31A . . . 6-31F. The first multiplier 6-31A of the multiplier element 6-31 multiplies the first sample (row in the register element 6-22A) of each input signal alternately by the first sample (row in the memory element 6-26A) of each code replica. Similarly, the multiplier 6-31B multiplies samples obtained from the register stage 6-22B and the memory element 6-26B, etc. The signals multiplied in the multipliers 6-31A . . . 6-31F are then summed up in the adder element 6-29. If the number of signals, i.e. channels, to be searched for at a time is below the total number of spreading signals to be search for, the code replicas to searched for can be changed periodically. The code replicas can be stored for example in the ROM and they are time multiplexed by changing the memory address using for example a counter.

Figure 8:
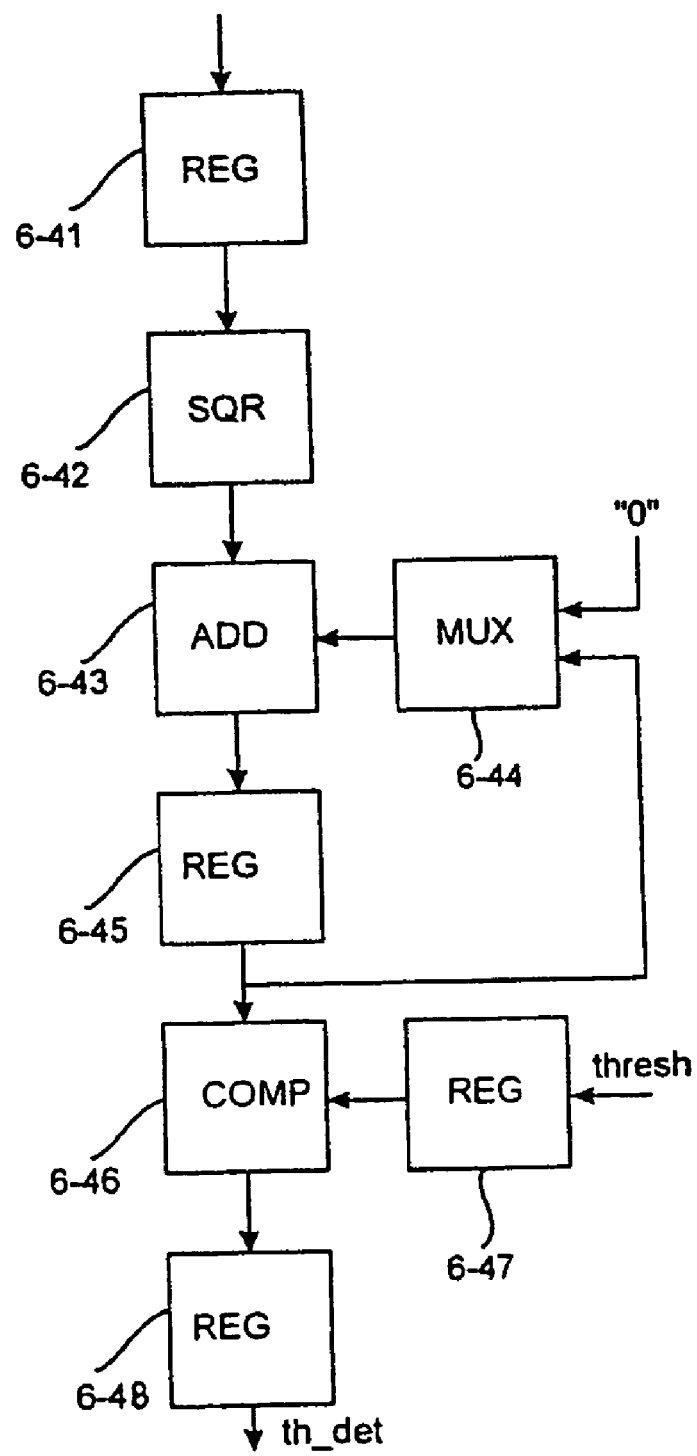
FIG. 8 is a block diagram illustrating a data path search arithmetic part according to the primary embodiment of the invention.

FIG. 8 illustrates the last part of the data path block, the arithmetic unit. The arithmetic unit calculates an estimate, in this case the square of the absolute value, of the absolute value of the complex output samples coming from the matched filter. Mathematically, this is performed by squaring the real and imaginary parts of a complex number and summing them up. The correlation results obtained from the matched filter (output 6-30 in FIG. 6 or 7) are applied to a register 6-41, which stores the results until they are squared in a block 6-42. The squaring block 6-42 takes one number and calculates its square. Squaring is performed separately for both I and Q components. The squares of the I and Q branches are then summed up in an adder 6-43. This yields the square of the absolute value of a complex input signal. The summing is performed the first time (squared sample of I branch) by summing up the result of the squaring with a zero obtained from the output of a multiplexer 6-44. The result is stored in a register 6-45. The second time (squared sample of Q branch) the result of the squaring is summed up with the output (squared sample of I branch) of the previous summing obtained via the multiplexer 6-44. When the matched filter calculates the components (I and Q) of each complex sample in succession, the squares of the absolute values can be easily calculated by summing up the results of two successive squarings.

Finally, the sums are compared in a comparator 6-46 with a threshold value stored in a register 6-47, and the comparison result is applied via the register 6-48 to the state machine 4-3 in FIG. 4. To increase the probability of the right decision and to decrease the probability of wrong decisions, any exceeding of the threshold value levels must be secured by waiting for several comparison results corresponding to the same phase difference and reference signal. If sufficiently many comparisons exceed the threshold value level, the signal can be declared found at good certainty. The state machine 4-3 implements a verification algorithm by means of which the threshold value level can be lowered so low that even weak signals are found without wrong decisions being made on the finding of a signal. The obtained phase difference of the signal is used in the receiver to initialize a local reference code generator to the right phase.

Since in a general case the frequency uncertainty of a receiver exceeds the total bandwidth ($1/T_1$) of the data path, a received signal has to be searched for using several frequency values. For this reason, the carrier frequency can be adjusted when the phase inaccuracy of the entire spreading code has been gone through.

State Machine

The state machine is responsible for higher-level signal search control of a matched filter MF. It implements K state machines operating in parallel, each of which is responsible for searching for one reference signal. The operations of state machine channels are independent of each other except for changing the frequency of the carrier frequency replica, which always takes places only when each of the channels has processed all possible code phase offsets once. This means that some channels could search the code phase offsets at each frequency more than once and that the time between frequency sweepings depends on the slowest channel to check all code phases.

Figure 9:
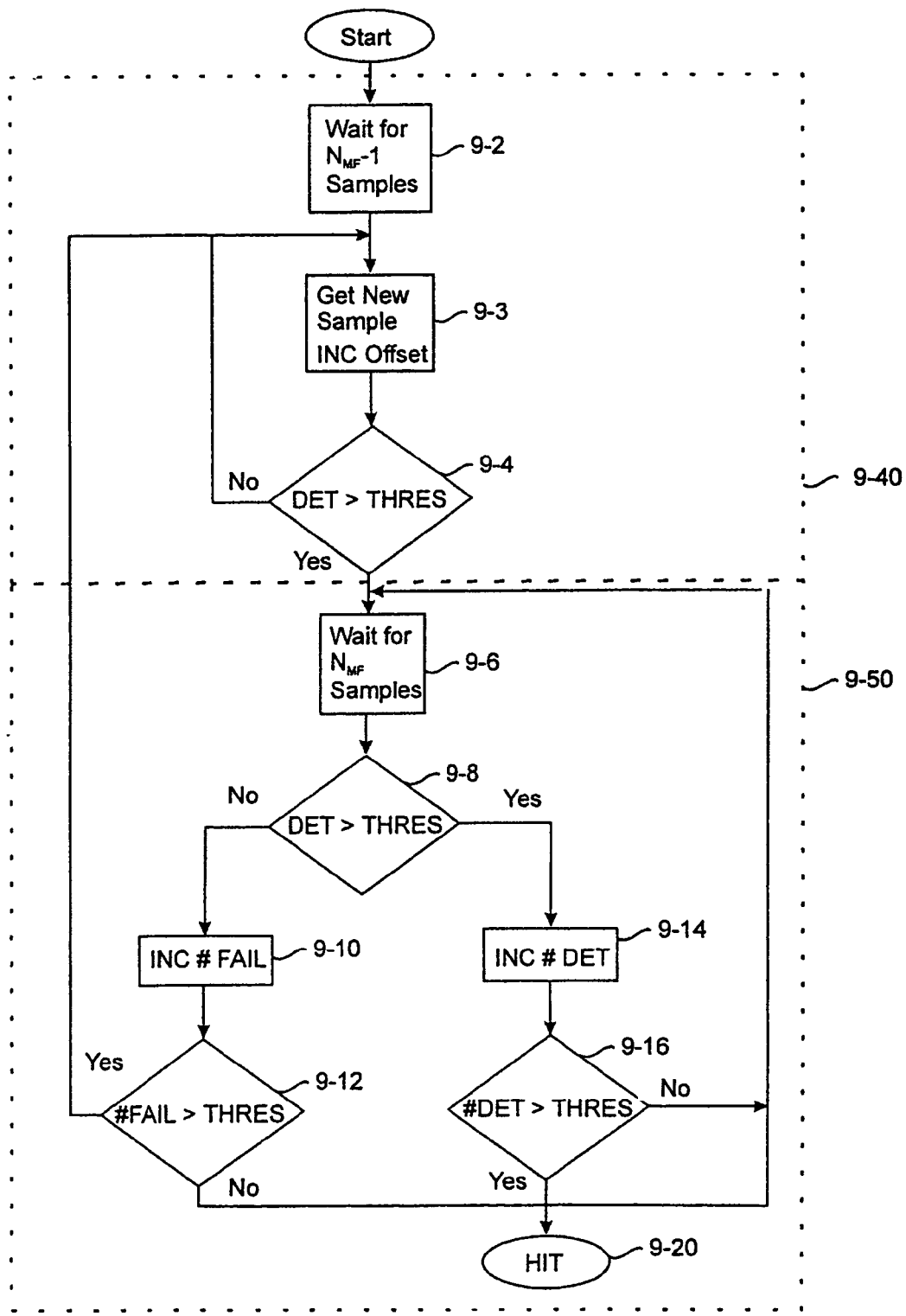
FIG. 9 is a functional flow diagram of an acquisition system according to the primary embodiment of the invention.

In the primary embodiment of the invention, an acquisition system using the above matched filter can be controlled by the state machine 4-3 that attends to the implementation of the verification algorithm for phase differences that exceeded the threshold value comparisons and to the sweeping of carrier frequencies for the search for several frequency offsets. FIG. 9 shows an example of the functional flow diagram of a state machine and an acquisition system. In this example, the length of the filter is $N_{MF}$ samples, and the acquisition system of the matched filter comprises K parallel time-dividedly separated channels.

In step 9-2, one sample at a time of an input signal is loaded to a data register. Since the length of the matched filter is $N_{MF}$ samples, $N_{MF}-1$ samples are loaded to the shift register. In step 9-3, still another new sample is loaded to the shift register, i.e. the last sample $N_{MF}$ of the input signal. In step 9-4, the data in the shift register is compared with a code replica, i.e. a reference signal, which is a PRN type of signal. If the correlation does not exceed the set threshold value, the next sample of the input signal is loaded to the shift register in step 9-3. In the simplest case, exceeding the threshold value means that the signal corresponding to said reference signal is detected and its spreading code is in phase with the stored reference signal. This information is used to initiate actual signal tracking and reception. However, if the strength of the received signal is low as compared with noise, simply exceeding the threshold value is not sufficient to prove that the signal was found. For this reason, an algorithm can be used to verify the finding, whereby after the exceeding of the first threshold value a new input signal is loaded into the shift register and correlated with the reference signal with the matched filter in a step corresponding to the point in time of the first finding.

Accordingly, if the reference value exceeds the set threshold value, the right phase of the code signal is potentially found, and the system transfers from signal tracking state 9-40 to a signal found verification state 9-50. Here, in step 9-6, the system first waits for $N_{MF}$ samples, and then repeats the comparison in step 9-8.

If the value is less than the threshold value, the value of register FAIL is incremented by one unit in step 9-10, the next step being 9-12. Here, the value of the register FAIL is compared with a set maximum value, which indicates the allowed number of times below the threshold value. If the number of comparison results below the threshold value exceeds a limit value set, the process returns to step 9-3. Otherwise, the next step is 9-6.

If the threshold value is exceeded, the value of register DET is incremented by one unit in step 9-14, the next step being 9-16. Here, the value of the register DET is compared with a set maximum value, which indicates the allowed number of times the threshold value has to be exceeded before the signal can be declared found. If the number of comparison results exceeding the threshold value does not exceed a limit value set, the process returns to step 9-6.

The process continues as above until the number of samples exceeding or below the threshold value exceeds a preset, at least one number/threshold value. Then, in step 9-20, the signal can be declared found, or, alternatively, the search is continued from the next data sample in step 9-3.

Said signal search routine is executed independently for each reference signal. After all data samples of all parallel channels have been checked, the frequency of the carrier replica oscillator is changed and the search process is repeated starting from step 9-2. When the search process is repeated at all desired frequencies of the carrier replica oscillator, its frequency is zeroed and the search is repeated.

If generators tied down to one frequency reference generate the carrier frequency and the spreading code for a direct sequence system receiver, then the offset of the carrier frequency can also be used to calculate the required adjustment value for the sampling clock of the matched filter. Otherwise, the sampling frequency of a matched filter has to be adjusted with another algorithm. However, the Doppler shifts of the carrier and spreading code are directly proportional in relation to their frequencies.

Figure 10:
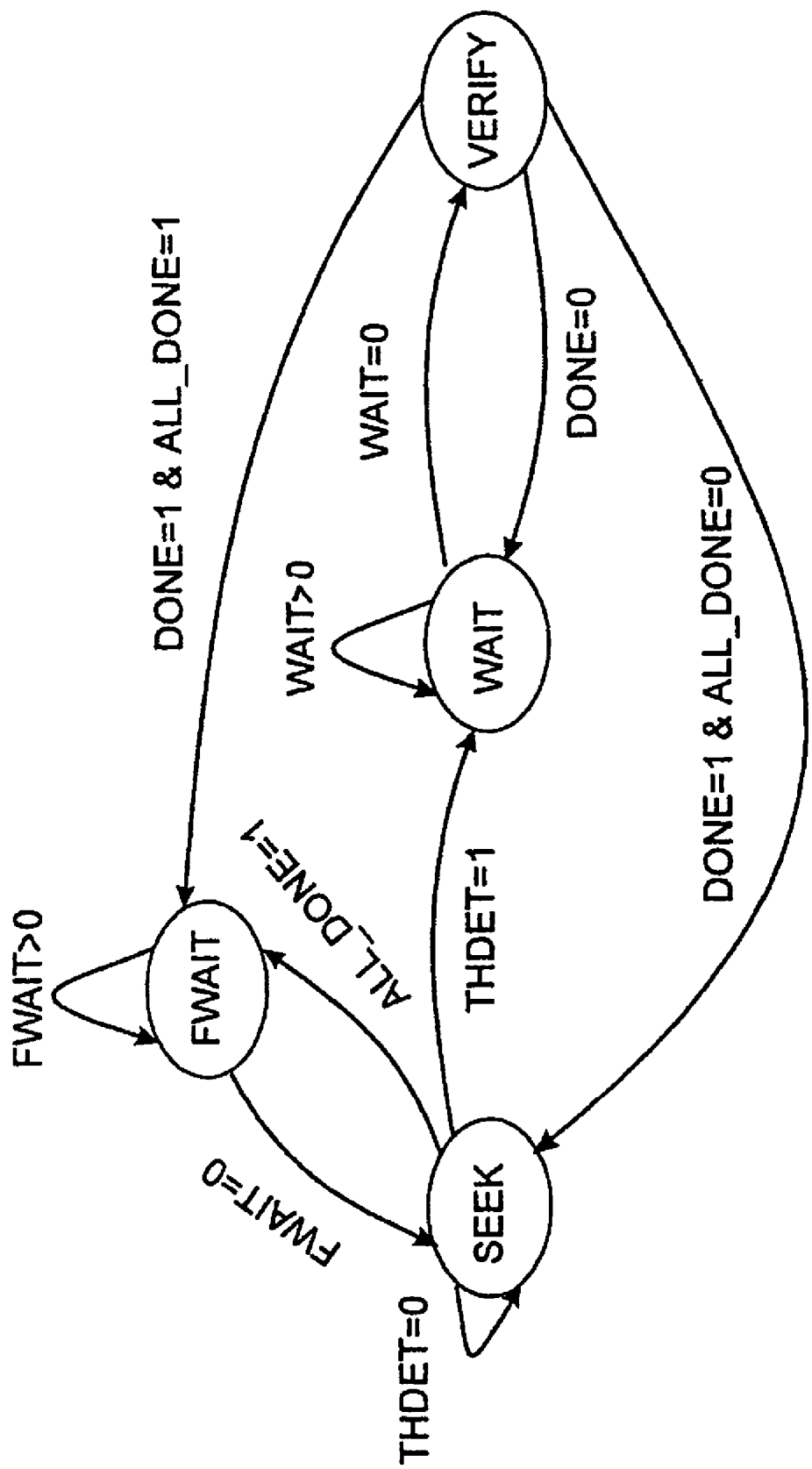
FIG. 10 is a state diagram illustrating a state machine according to the primary embodiment of the invention.

FIG. 10 shows the state diagram of a state machine controlling the search process according to the primary embodiment of the invention. The state machine has two active states and two states used for waiting. The initial state is an fwait state, in which new data is clocked to shift registers. In this state, waiting takes as many sample clock cycles as there are bits in the shift register, i.e. $N_{MF}$ samples. Having waited for sweeping, the process enters the seek state. In this state, the output of the threshold value detector is checked for each sample, and if the threshold value is exceeded, the next state, verify wait, is entered, the DET counter is set to one and the FAIL counter to zero. If no exceeding of the threshold value occurred for any code offset ($N_{MF}$ samples), the state machine sets a DONE flag for the current channel. Once all state machine channels are verified for each possible code phase offset, i.e. when all DONE flags are set, and all carrier frequencies to be searched have been gone through, the fwait state is re-entered.

In the verify wait state the state machine waits till completely new data is clocked inside the data shift register to improve the statistical quality of the detection, and a new comparison is carried out using the same code offset. To ensure signal detection, the threshold value comparisons are repeated several times in the same code offset state. After a wait of the length of a code ($N_{MF}$ samples) in the verify wait state, the verify state is entered. In this state, the value of the threshold value detector is checked, and if detection is indicated, the DET counter is incremented by one. Otherwise, the FAIL counter is incremented by one. If the numbers of hits (DET) and failures (FAIL) are still below their maximum values, the verify wait state is re-entered. Otherwise, if the number of hits (DET) exceeds the maximum value, the signal is declared found and the current PRN code, frequency and code offset are given as the output of the acquisition system.

After the last verification, there are two outcomes. If the code offset is the last one, the frequency is changed and the fwait state is entered. Otherwise, the seek state is entered, and the search is continued as usual.

A state machine sweeps between the low and high limit values of a local oscillator frequency (LO) in configurable steps. The frequency range searched for is composed of a fixed intermediary frequency (IF) and a Doppler frequency. These limit values are set according to the actual RF (Radio Frequency) front-end intermediary frequency (IF) and the maximum expected Doppler shift. State machines also have a method of setting the acquisition into its initial state. When a multi-channel matched filter is used, the state machine sees to it that the frequency search does not take place until all channels have once gone through all phase differences. In other respects, the different channels operate completely irrespective of each other. This ensures the best advantage obtained from parallelism.

Pre-Processing Block

Figure 11:
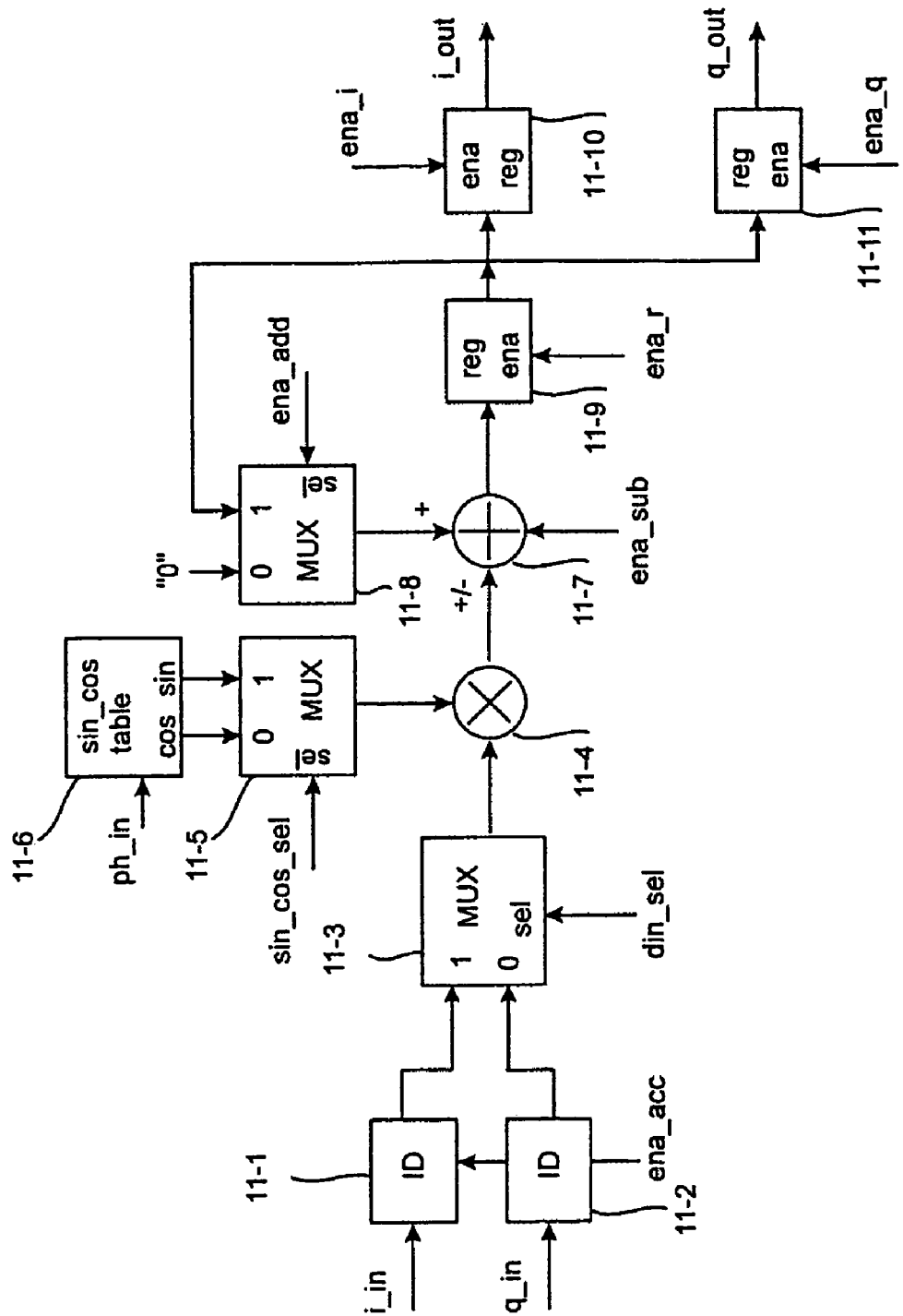
FIG. 11 is a more detailed implementation of the pre-processing block of FIG. 5.
Figure 12:
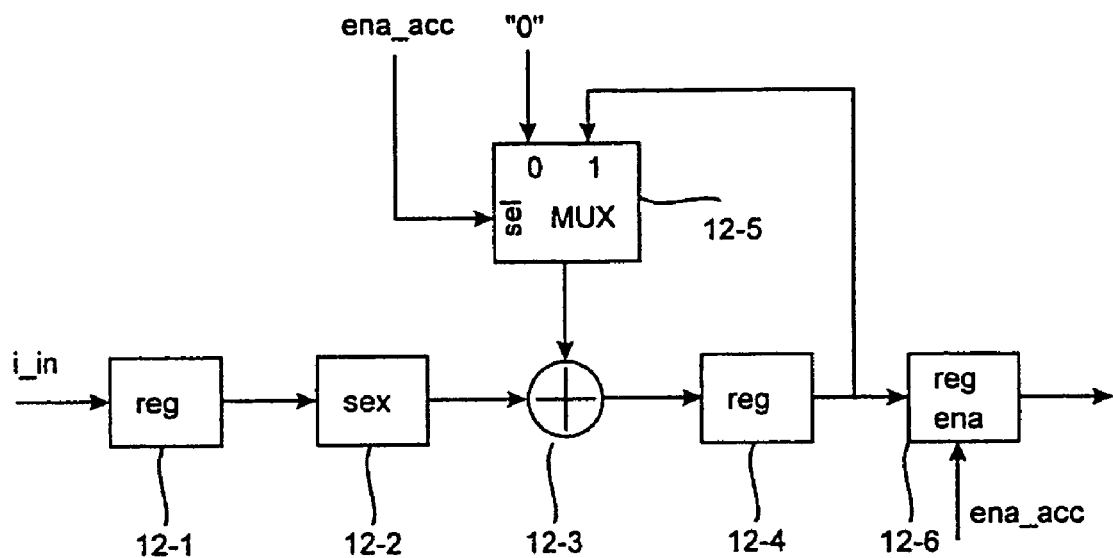
FIG. 12 is a block diagram of an integrate/dump filter.

FIG. 11 shows a more detailed block diagram of the signal preprocessing block shown in FIG. 5. An input signal i_in and q_in is decimated at ratio $N_{DEC}$ in two integrate/dump filters 11-1 and 11-2. FIG. 12 shows a more detailed block diagram of integrate/dump (ID) filters. The operation of the filter is very simple. Data i_in enters a register 12-1, and its sign is then extended in block 12-2. The data is then applied to an adder 12-3, from the adder to a register 12-4 whose outputs are applied to a multiplexer 12-5 and to a holding register 12-6. Adder 12-3 sums up $N_{DEC}$ samples incoming via the multiplexer 12-5 into a register 12-4 acting as an accumulator. The first sample of the summing iteration is loaded directly to the accumulator 124 by adding 0 thereto (obtained from a second input of the multiplexer 12-5). In other iterations, the output of the multiplexer 12-5 is the output of the accumulator register 12-4.

Referring again to FIG. 11, the outputs of integrate/dump filters 11-1 and 11-2 are applied to the multiplexer 11-3, which, according to its selection signal (din_sel) selects alternately one of the inputs as output, which is applied to the multiplier 11-4. To a second input of the multiplier is applied an output from the multiplexer 11-5, which, according to its selection signal (sin_cos_sel), selects from a sine/cosine table 11-6 a cosine output or a sine output to be applied to the multiplier 11-4. Table 11-6 is controlled by a locally generated carrier replica phase signal ph_in. The adder 11-7 can alternatively sum up the output of the multiplier and the output of the multiplexer 11-8 or subtract the output of the multiplier from the output of the multiplexer. The adder is controlled by a signal ena_sub. The output of the adder 11-7 is applied to an accumulator register 11-9, whose output is further applied to holding registers 11-10 and 11-11 and to the multiplexer 11-8. Zero (0) is applied to a second input of the multiplexer 11-8 and it is controlled by a selection signal ena_add. The registers 11-10 and 11-11 give data outputs i_out and q_out, respectively.

The structure shown in FIG. 11 is used to perform complex multiplication with carrier replica ($e^{j2\pi\omega_c n/F_s}=\cos(2\pi\omega_c n/F_s)+j\cdot\sin(2\pi\omega_c n/F_s)$) in accordance with the following algorithm:

1. ACC=i_in·cos(LO)
2. ACC=ACC+q_in·sin(LO)→i_out
3. ACC=q_in·cos(LO)
4. ACC=ACC−i_in·sin(LO)→q_out, Numerically Controlled Oscillator (NCO)

Figure 13:
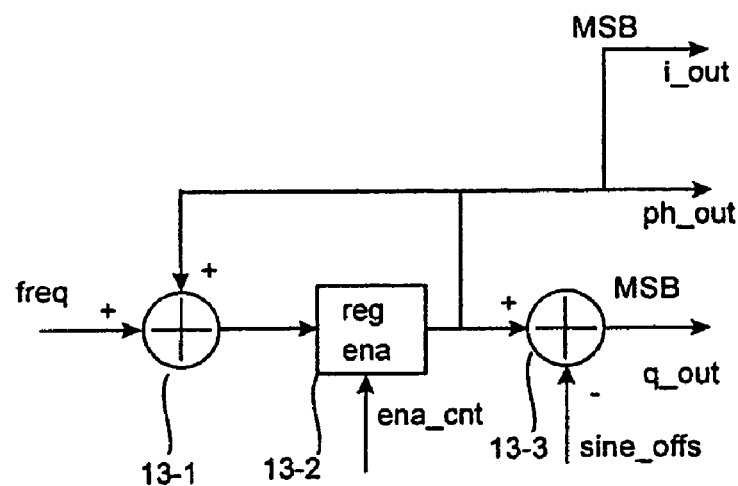
FIG. 13 is a block diagram of a numerically controlled oscillator.

FIG. 13 illustrates a numerically controlled oscillator. The NCO comprises a phase accumulator that accumulates frequency input values for each sample. The accumulator is composed of an adder 13-1 and a register 13-2. The output of the register 13-2 generates a signal ph_out.

Address Generator Unit

Figure 14:
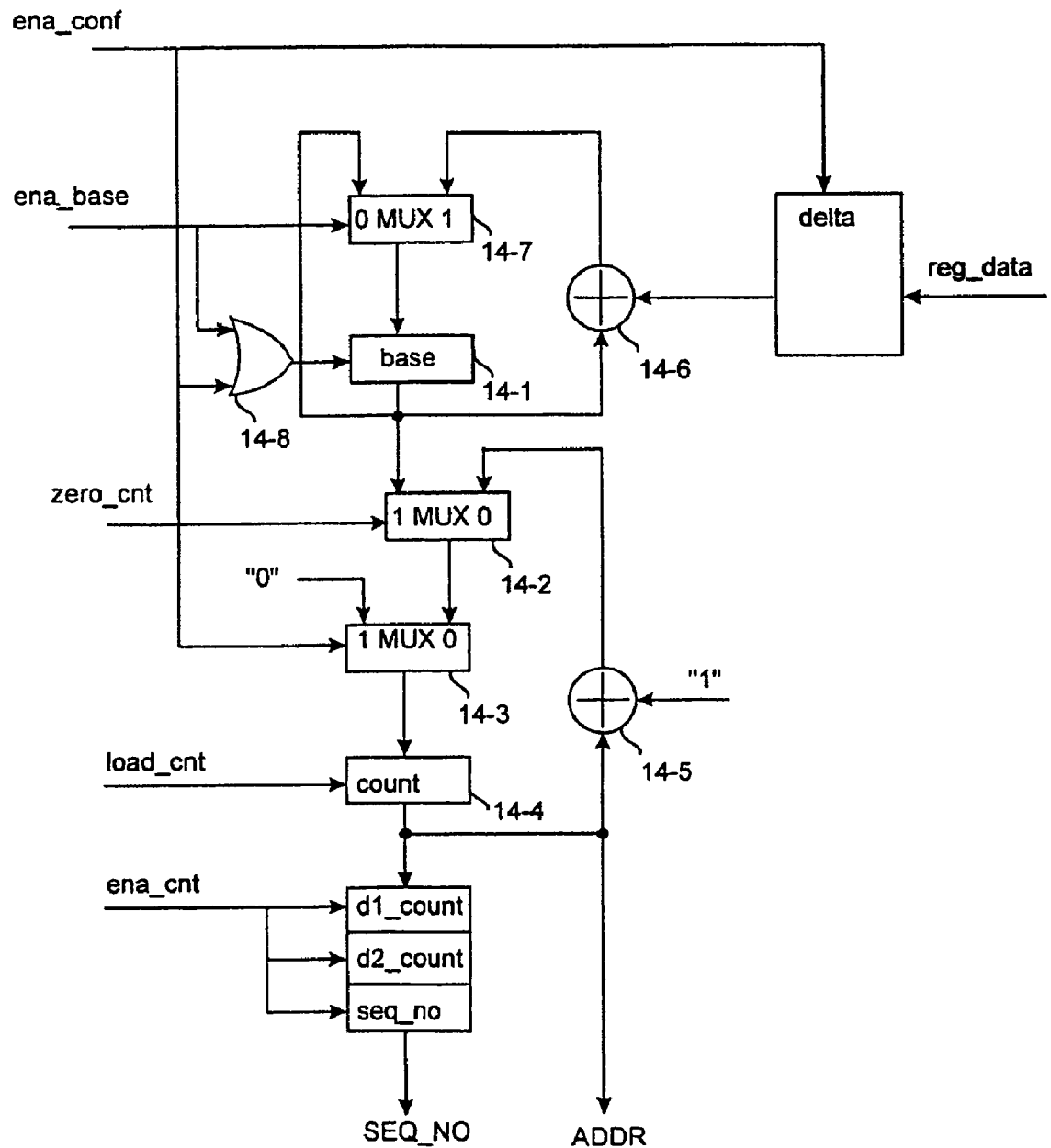
FIG. 14 is a block diagram of an address generator.

FIG. 14 shows the block diagram of an address generator unit of a code replica memory. The circuit comprises a basic register base 14-1, from which an address is first loaded via multiplexers 14-2 and 14-3 to an address counter 14-4. The multiplexer 14-3 is controlled by a signal ena_conf. The value of the address counter 14-4 is incremented in a loop comprising an adder 14-5 and the multiplexers 14-2 and 14-3, until a signal zero_cnt, which controls the multiplexer 14-2, forces the value of the basic register 14-1 to be loaded again to the address counter (count) 14-4. On the other hand, a loop comprising an adder 14-6 and a multiplexer 14-7 periodically increases the value of the basic register 14-1 when a control signal ena_base is set to one. The state machine 4-3 attends to this when all code replicas in the present group have been checked. The signal ena_base is applied to the basic register 14-1 via an OR gate 14-8, whose second input is the signal ena_conf. The value for increasing the basic register 14-1 can be set by loading it to a register delta 14-8.

Control Block

A control signal for the data path 4-1 and the state machine 4-3 is generated in an MF control block 4-2 by decoding values 12-2, which are obtained from a counter 12-1 that counts from value 0 to value 2·K−1, as FIG. 12 illustrates. This yields a sample rate, equal to the main clock divided by the value 2·K. Since the data path 4-1 processes K reference signals at the same time, it only has two clock cycles time to perform all operations. Chained, the total delay of the data path from the input of the shift register to the state machine is eight clock cycles. Input signal processing and data path operation are interleaved such that they both process data in parallel. The data path uses the inputs one sample later.

The operations required by the data path can be divided into three parts: during the first part, the I channel result is calculated, the Q channel result is then processed during the second part and added to the result of the I channel. Finally, the result is compared during the last part. All these operations can be interleaved by means of pipeline registers on the data path. The control signals for the data path are generated as a continuous stream except for two cases: start-up and re-synchronization. In these cases, the generation of the control signals is delayed by a time corresponding to the total pipeline delay of the components preceding said block.

As was described above, in the system and method of the invention and its preferred embodiments, the implementation of a multi-channel matched filter has been solved efficiently and in a manner that saves complex components.

It is obvious to a person skilled in the art that as technology advances, the basic idea of the invention can be implemented in a variety of ways. The invention and its embodiments are thus not limited to the above examples, but may vary within the claims.

The invention claimed is:

1. A matched filter for determining the correlation of input signals and reference signals, comprising:
   a first memory for storing at least one sample taken from a plurality of input signals, wherein the at least one sample is stored at a storage rate of a frequency of at least one input signal;
   a second memory for storing a plurality of reference signals, each reference signal corresponding to more than one transmitter;
   a multiplexer, coupled to the first and second memories, for multiplexing the input signals and the reference signals from the first and second memories; and
   a processor, coupled to the multiplexer, for calculating the correlation for a combination of the input signals and the reference signals, wherein correlation results for different signals appear as a sequence.

2. The matched filter of claim 1, wherein the processor further comprises: a comparator for comparing each sample of the plurality of input signals with a corresponding sample of the reference signals and gives a plurality of comparison results; and
   an adder for summing up the comparison results and generating a correlation result at an output of the matched filter.

3. The matched filter of claim 2, wherein the comparison results are 1-bit comparison results.

4. The matched filter of claim 3, wherein the comparator is selected from a group comprising: a multiplier, an XOR circuit or an XNOR circuit.

5. The matched filter of claim 1, further comprising a receiver for receiving the input signals from a pre-processor, wherein the input signals are each comprised of an I component and a Q component, and wherein the pre-processor processes an $I_{in}$ signal a $Q_{in}$ signal for each of the input signals to provide corresponding $I_{out}$ signals and $Q_{out}$ signals to the receiver.

6. The matched filter of claim 5, wherein the pre-processor generates the $I_{out}$ signals and $Q_{out}$ signals as follows:
   $ACC_I = I_{in} \cdot \cos(LO)$,
   $I_{out} = ACC + Q_{in} \cdot \sin(LO)$,
   $ACC_Q = Q_{in} \cdot \cos(LO)$, and
   $Q_{out} = ACC - I_{in} \cdot \sin(LO)$
   where,
   $ACC_I$ is an initial accumulation register value for $I_{out}$,
   $ACC_Q$ is an initial accumulation register value for $Q_{out}$ and
   LO is a local oscillator frequency.

7. A spread spectrum receiver comprising a device for detecting a demodulated signal, received by the receiver and converted into digital samples, the device comprising
   A) a matched filter for determining the correlation of input signals and reference signals, the matched filter comprising:
   a first memory for storing at least one sample taken from a plurality of input signals, wherein the at least one sample is stored at a storage rate of a frequency of at least one input signal;
   a second memory for storing a plurality of reference signals, each reference signal corresponding to more than one transmitter;
   a multiplexer, coupled to the first and second memories, for multiplexing the input signals and the reference signals from the first and second memories; and
   a processor, coupled to the multiplexer, for calculating the correlation for a combination of the input signals and the reference signals, wherein correlation results for different signals appear as a sequence; and
   B) a controller for comparing the correlation results generated by the matched filter with a predetermined threshold value to determine if a signal is found.

8. The spread spectrum receiver of claim 7, wherein the processor further comprises: a comparator for comparing each sample of the plurality of input signals with a corresponding sample of the reference signals and gives a plurality of comparison results; and
   an adder for summing up the comparison results and generating a correlation result at an output of the matched filter.

9. The spread spectrum receiver of claim 8, wherein the comparison results are 1-bit comparison results.

10. The spread spectrum receiver of claim 9, wherein the comparator is selected from a group comprising: a multiplier, an XOR circuit or an XNOR circuit.

11. The spread spectrum receiver of claim 7, wherein the outputs of the matched filter are at least one complex correlation sample, and the spread spectrum receiver further comprises an arithmetic unit for squaring components of the complex correlation sample and for summing up the squared components.

12. A spread spectrum receiver as claimed in claim 11, wherein the arithmetic unit sums up the correlation sample corresponding to the same phase difference of two or more input signals, the sum corresponding to a correlation result that is calculated with one phase difference and whose integration time is M·L samples, wherein M is the length of the matched filter in number of samples and L is the number of correlation samples summed up by an accumulator.

13. A spread spectrum receiver as claimed in claim 7, wherein the controller processes several comparison results corresponding to the same phase difference and reference signal, and in response to a predetermined proportion of the gathered comparison results indicating that the output value exceeded said threshold value, declares the signal found.

* * * * *